United States Patent
Sengodan et al.

(10) Patent No.: US 6,918,034 B1
(45) Date of Patent: Jul. 12, 2005

(54) METHOD AND APPARATUS TO PROVIDE ENCRYPTION AND AUTHENTICATION OF A MINI-PACKET IN A MULTIPLEXED RTP PAYLOAD

(75) Inventors: Senthil Sengodan, Woburn, MA (US); Baranitharan Subbiah, Sunnyvale, CA (US)

(73) Assignee: Nokia, Corporation, Espoo (FI)

( * ) Notice: Subject to any disclaimer, the term of this patent is extended or adjusted under 35 U.S.C. 154(b) by 0 days.

(21) Appl. No.: 09/408,567

(22) Filed: Sep. 29, 1999

(51) Int. Cl.$^7$ .................................................. H04J 3/16
(52) U.S. Cl. ........................ 713/160; 713/150; 713/152; 713/153; 713/161; 370/473; 370/474; 370/505
(58) Field of Search ................................ 713/150–153, 713/160–161; 370/473, 474, 505, 476

(56) References Cited

U.S. PATENT DOCUMENTS

| | | | | |
|---|---|---|---|---|
| 4,375,097 A | * | 2/1983 | Ulug | 370/400 |
| 5,345,507 A | * | 9/1994 | Herzbert et al. | 380/28 |
| 5,917,830 A | * | 6/1999 | Chen et al. | 370/487 |
| 6,229,821 B1 | * | 5/2001 | Bharucha et al. | 370/471 |
| 6,243,373 B1 | | 6/2001 | Turock | |
| 6,259,691 B1 | | 7/2001 | Naudus | |
| 6,295,293 B1 | | 9/2001 | Tönnby et al. | |
| 6,304,567 B1 | | 10/2001 | Rosenberg | |
| 6,320,869 B1 | * | 11/2001 | Van Driel et al. | 370/443 |
| 6,327,660 B1 | * | 12/2001 | Patel | 713/193 |
| 6,366,961 B1 | * | 4/2002 | Subbiah | 709/238 |
| 6,396,840 B1 | * | 5/2002 | Rose et al. | 370/401 |

OTHER PUBLICATIONS

Perkins et al., "RTP Payload for Redundant Audio Data", Network Working Group, Sep. 1997 URL http://www.phys-iasi.ro/library/RFCs/rfc2198.html.*

John Ioannidis, "The swIPe IP Security Protocol", swIPe Internet Draft, Dec. 3$^{rd}$, 1993 URL http://www.sandelman.ottawa.on.ca/ipsec/1993/12/msg00000.html.*

Casner et al., "Compressing IP/UDP/RTP Headers for Low-Speed Serial Links", Internet at http://search.ietf.org/internet–drafts/draft–ietf–avt–crpt–05.txt, 19 pages (Jul. 27, 1998).

(Continued)

Primary Examiner—Gregory Morse
Assistant Examiner—Tongoc Tran
(74) Attorney, Agent, or Firm—Squire, Sanders & Dempsey L.L.P.

(57) ABSTRACT

A method and apparatus to provide encryption and authentication of a mini-packet in a multiplexed real time protocol (RTP) payload. Mini-packets are assembled into a payload wherein each mini-packet includes an associated mini-header for ensuring proper processing of each mini-packet. Padding is added to mini-packets when the mini-packets are encrypted to insure each mini-packet is an integral multiple of a predetermined block size. Padding for each mini-packet is determined according to $p=n-k*floor((n-1)/k)$, wherein p is the amount of padding added to each mini-packet, n is the actual data size, and k is the block size. The padding added to the data for each packet comprises p–1 units of padding and a final padding unit for indicating the amount of padding. An authenticator may also be added to each mini-packet. A length indicator is set in each mini-header for indicating a total length of the mini-packet including the authenticator. The authenticator may then be removed based upon knowing a type of authentication used for generating the authenticator.

27 Claims, 6 Drawing Sheets

OTHER PUBLICATIONS

ITU-T, 1.363.2: B-ISDN ATM Adaptation Layer Specification: Type 2 AAL, 50 pages (Sep. 1997).

ITU-T, 1.366.1: Segmentation and Reassembly Service Specific Convergence Sublayer for the AAL Type 2, 52 pages (Jun. 1998).

Rosenberg et al., "An RTP Payload Formal for User Multiplexing", Internet at http://search.ietf.org/internet . . . aft-ieft-avt-aggregation-00.txt, 10 pages (May 6, 1998).

Schulzrinne et al., "RTP: A transport Protocol for Real-Time Applications", Internet at http://info.internet.isi.edu:80/in-notes/rfc/files/rfc1889.txt, 65 pages (Jan. 1996).

"An RTP Payload Format for User Multiplexing", Rosenberg and Schulzrinne, internet site locate at URL:http://ee.mokwon.ac.kr/%7Ejspark/rtp/standard/internet-drafts/draft-ietf-avt-aggregation-00.txt, May 6, 1998, 10 pages.

"User Multiplexing in RTP payload between IP Telephony Gateways", Subbiah and Sengodan, internet site located at URL:http://www.fokus.gmd.de/research/cc/glone/projects/ipt/players/ietf/draft-ietf-avt-mux-rtp-00.txt, Aug. 12, 1998, 17 pages.

"An RTP Simple Multiplexing Transfer Method for Internet Telephony Gateway", Tanigawa et al., internet site located at URL:ftp://ftp.bbnplanet.com/internet-drafts/draft-tanigawa-rtp-multiplex-00.txt, Jun. 16, 1998, 4 pages.

J. Rosenberg et al., "Issues and Options for an Aggregation Service within RTP", *Internet Engineering Task Force*, p. 1-20 (Nov. 26, 1996).

\* cited by examiner

METHOD AND APPARATUS TO PROVIDE ENCRYPTION AND AUTHENTICATION OF A MINI-PACKET IN A MULTIPLEXED RTP PAYLOAD

BACKGROUND OF THE INVENTION

1. Field of the Invention.

This invention relates in general to Internet Protocol (IP) telephony, and more particularly to a method and apparatus to provide encryption and authentication of a mini-packet in a multiplexed real time protocol (RTP) payload.

2. Description of Related Art.

Traditionally, voice has been carried over circuit switched networks (CSN) that are designed especially for transmitting voice, e.g. PSTN and GSM. During the past twenty years, telephone systems have steadily improved and changed as businesses became dependent upon reliable communication that could overcome barriers of time and distance. As a result, enterprise-wide communications platforms have been developed to deliver a broad range of telephony services. The networking services available on these platforms include automatic least-cost routing and class-of-service routing, and applications such as voice mail, mobility and call centers.

During this same time period, packet switching also grew to provide reliable and easy-to-use file transfer, transaction processing and information access. Packet switching systems were first implemented as proprietary systems running over private lines. However, today packet switching has evolved into standards-based, virtual-circuit networks, e.g., frame relay and Asynchronous Transfer Mode (ATM), and the Internet. The development and wide implementation of Ethernet in the 1980s led to bridges and routers and, more recently, local area network (LAN) switching. Transfer speeds have increased, prices have decreased and there are now more than 200 million Internet and Ethernet users worldwide.

Currently, there is a lot of interest for the transmission of voice over packet switched networks (PSN). The next big development in telecommunications will be combining the Internet with mobile phones and other devices such as personal digital assistants (PDAs). Soon consumers will be using small communication devices that combine features such as mobile telephones, Internet terminals, music systems, video systems, cameras, etc. Further, the Internet and the growing convergence around the Internet Protocol (IP) present great opportunities for businesses to capture new markets, serve customers better, reduce costs and improve productivity.

The biggest challenge facing IP telephony will be accommodating business-critical applications. They include call centers, Interactive Voice Response (IVR), and other speech-activated applications, mobility and single-number roaming services, and unified messaging.

These types of applications accentuate the need for IP telephony to address the difficult issue of transmission quality. Over time, the telephone network has become very reliable and delivers consistently high-quality service. In contrast, on today's intranets and the public Internet, the quality of service is virtually nonexistent. File download times and the time required to pull up a web site varies, and the time for e-mail to reach its intended destination is dependent upon many network factors. Increasing the bandwidth of Internet links has been the focus of most efforts to improve the quality of service. However, increasing bandwidth is only a partial fix for the short term. In the long run, other strategies are required.

At present, IP networks offer a single class of service called best effort, which can not guarantee any Quality of Service (QoS) to applications. To support delay sensitive applications such as voice and interactive multimedia, there have been many proposals submitted to the Internet Engineering Task Force (IETF) on how to integrate QoS in IP networks. These proposals include differentiated service (diff-serv), Integrated services (Int-serv) and Multi Protocol Label Switching (MPLS). Despite these efforts, QoS in IP is still elusive and could take some time before it is deployed over global Internet.

As suggested above, IP telephony has emerged as a potential application to challenge the traditional phone companies by offering long distance telephone service over Internet for low prices. There are a large number of equipment vendors offering IP telephone gateways and accessories to provide IP telephony service to corporate customers and Internet Service Providers (ISPs). IP telephone standards such as H.323, H.225 and H.245 have been standardized to enhance the rapid deployment of IP telephone services in the global Internet. Even though, IP telephone is not a reality in the public Internet today, it has been more successful in Intranet and Virtual Private Networks (VPN) environments.

In trials, IP telephone services have been demonstrated to have the potential to match the voice quality offered by traditional telephone networks. As a result, the growth of IP telephone gateways in corporate and ISP environments is expected to increase exponentially in the coming years. IP telephone gateways act as an interface between the existing PSTN and PBX networks and IP networks. This method allows one PSTN user to call another PSTN user connected through IP telephone gateways. thus eliminating the need for long distance telephone network.

In a IP telephony connection, two sides of the PSTN/PBX users (two branches of the same company) are interconnected by IP telephone gateways. In such application, a telephone call between PSTN/PBX users located at either side of the gateways is carried by a separate Real-time Transport Protocol/User Datagram Protocol/Internet Protocol (RTP/UDP/IP) connection. RTP is an Internet protocol for transmitting real-time data such as audio and video. RTP itself does not guarantee real-time delivery of data, but it does provide mechanisms for the sending and receiving applications to support streaming data. Typically, RTP runs on top of the UDP protocol, although the specification is general enough to support other transport protocols. The User Datagram Protocol is a connectionless protocol that, like TCP, runs on top of IP networks. Unlike TCP/IP, UDP/IP provides very few error recovery services, offering instead a direct way to send and receive datagrams over an IP network.

IP telephony gateways provide an interface between the existing circuit switched telephone networks (such as PSTN and GSM) and the packet switched IP data networks. In traditional IP telephony applications, telephone calls between PSTN users interconnected by a pair of IP telephony gateways to compress incoming PSTN speech samples generate packets with sizes ranging from 5 to 20 bytes per speech sample.

For example, G.723.1 (the most popular IP telephony codec and the International Multimedia Teleconferencing Consortium's (IMTC) Voice over IP (VoIp) mandatory low bit-rate codec), generates a 20 byte speech packet at 30 ms intervals. Many codecs used in cellular environment generate less than 10 byte packet per speech sample. Small size packets are subjected to large overhead when transferred using the Real time Transport Protocol (RTP). The RTP/UDP/IP overhead is 40 bytes (12+8+20) for a simple speech packet. For example, a 10 byte packet transferred via RTP/UDP/IP increases the overhead to 80% (40 byte overhead/50 byte overhead plus packet). In addition, for each call request a single UDP/IP connection (a pair of UDP ports) is established between the gateways requiring a large state (memory) to be maintained at the telephony gateways, thereby making these less scaleable.

Congestion in IP networks results in packet loss at routers and UDP does not have any retransmission mechanism to recover lost packets. Also, real time applications such as speech is intolerant to delay caused by retransmission. In traditional RTP method, each individual speech packet is transmitted as a IP packet, which generates a large number of packets between gateways. This heavy traffic volume is a potential situation for congestion and packet loss at IP routers.

To overcome these this problem, an efficient real-time transport protocol multiplexing method and apparatus for transporting compressed speech between IP telephony gateways has been proposed in co-pending and commonly-assigned U.S. patent applications Ser. No. 09/137,276, by Baranitharan Subbiah, entitled "METHOD AND APPARATUS FOR PROVIDING EFFICIENT USER MULTIPLEXING IN A REAL-TIME PROTOCOL PAYLOAD FOR TRANSPORTING COMPRESSED SPEECH BETWEEN IP TELEPHONY GATEWAYS, herein referred to as "Subbiah." Subbiah describes a protocol that eliminates bandwidth usage inefficiencies in transporting short packets between nodes connected by an IP network, wherein the method and apparatus enables a number of users to share a single RTP/UDP/IP connection. The protocol includes creating a header for a plurality of data packets, each header providing identification of a user associated with a packet, adding each header to the data packet associated therewith to form mini-IP payloads, multiplexing the mini-IP payloads into a RTP payload and transmitting the RTP payload over a single RTP/UDP/IP connection.

While Subbiah disclose a method and apparatus for providing application layer multiplexing in IP networks to overcome the problem of high header overhead for packets with small payloads, some problems remain. For example, within a multiplexed RTP packet, several mini-IP packets are multiplexed into the same RTP payload. Each of these mini-IP packets may belong to the same stream, or, more likely, to different steams. However, it is desirable to provide different security services to each of the mini-IP packets.

Block encryption schemes require that the packet size be an integral multiple of block size. If a packet size does not equal an integral multiple of the block size then padding bytes need to be added to the packet. The block size itself is dependent on the encryption algorithm being used. For instance, the block size in DES is 64 bits. Block based symmetric encryption encompasses the most common schemes in use today. These include DES, triple-DES, IDEA, Blowfish etc. When such schemes are used in certain modes (ECB, CBC), they require the input to be an integral multiple of the block size.

Currently, there exist mechanisms for providing encryption at the IP level and at the RTP level. These mechanisms have taken into account the fact that block encryption schemes require the input to be an integral multiple of the block size. This has been made possible by suitable padding schemes. However, in an environment where several mini-packets are multiplexed into an TRP packet, no suitable encryption (and corresponding padding) mechanism has been proposed. Since the different mini-packets may belong to different streams, it may be desirable to apply different encryption schemes to the different mini-packets. Similarly, there exist mechanisms for authentication of packets at the IP level, but no such mechanism has been proposed to date for authentication at the mini-packet level.

It can be seen then that there is a need to provide padding and encryption on a mini-packet basis.

It can also be seen that there is a need for a mechanism to perform padding and encryption at the mini-packet level.

It can also be seen then that there is a need for a mechanism to perform authentication at the mini-packet level.

SUMMARY OF THE INVENTION

To overcome the limitations in the prior art described above, and to overcome other limitations that will become apparent upon reading and understanding the present specification, the present invention discloses a method and apparatus to provide encryption and authentication of a mini-packet in a multiplexed real time protocol (RTP) payload.

The present invention solves the above-described problems by providing a mechanism to perform padding, encryption and authentication at the mini-packet level.

A system in accordance with the principles of the present invention includes assembling mini-packets into a payload wherein each mini-packet includes an associated mini-header for ensuring proper processing of each mini-packet and adding padding to mini-packets when the mini-packets are encrypted to insure each mini-packet is an integral multiple of a predetermined block size.

Other embodiments of a system in accordance with the principles of the invention may include alternative or optional additional aspects. One such aspect of the present invention is that padding for each mini-packet is determined according to $p=n-k*floor((n-1)/k)$, wherein p is the amount of padding added to each mini-packet, n is the actual data size, and k is the block size.

Another aspect of the present invention is that the padding added to the data for each packet comprises p−1 units of padding and a final padding unit for indicating the amount of padding.

Another aspect of the present invention is that the unit is bytes.

Another aspect of the present invention is that the present invention further includes adding an authenticator to each mini-packet.

Another aspect of the present invention is that the present invention further includes setting a length indicator in each mini-header for indicating a total length of the mini-packet including the authenticator.

Another aspect of the present invention is that the invention further includes removing the authenticator based upon knowing a type of authentication used for generating the authenticator.

Another aspect of the present invention is that the type of authentication comprises HMAC-SHA1 and the authenticator is 20 bytes.

Another aspect of the present invention is that the type of authentication comprises HMAC-MD5 and be authenticator is 16 bytes.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus to provide encryption and authentication of a mini-packet in a multiplexed real time protocol (RTP) payload. The present invention provides a mechanism to perform padding and encryption at the mini-packet level.

Figure 1:
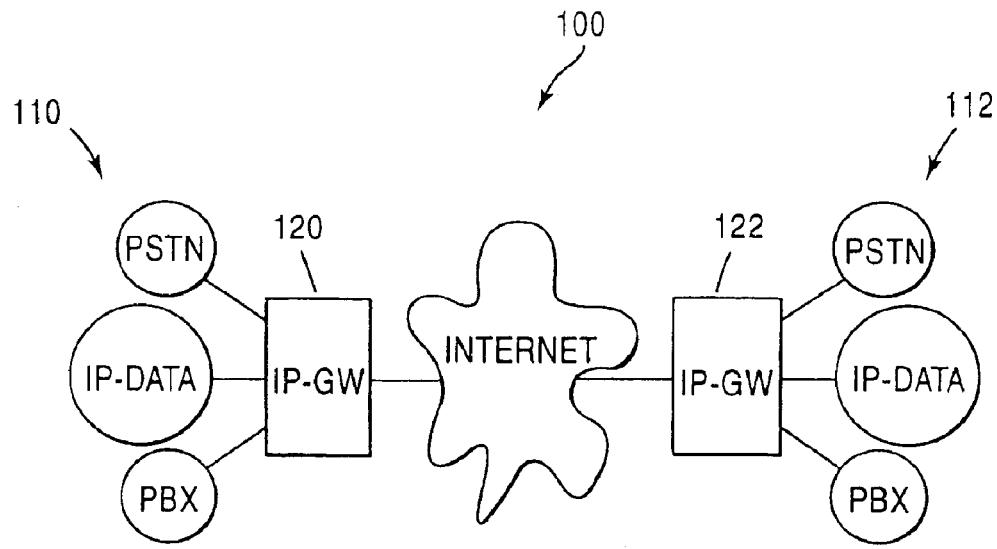
FIG. 1 shows an application scenario in which two sides of the PSTN/PBX are interconnected by IP telephone gateways.

FIG. 1 shows an application scenario 100 in which two sides of the PSTN/PBX 100, 112 (two branches of the same company) are interconnected by IP telephone gateways 120, 122. In such an application, a telephone call between PSTN/PBX users 110, 112 located at either side of the gateways 120, 122 is carried by a separate RTP/UDP/IP connection. The codecs used at the telephone gateway to compress incoming PSTN/PBX voice calls generates packets with a size ranging from 5 to 20 bytes.

For example, the IP telephone standard G.723.1 specifies a codec that generates a 20 byte packet at the interval of 30 ms speech sample. Many codecs used in cellular environments generate a small packet, e.g., on the average a 10 byte packet per speech sample. This small size packets require a large overhead when they are transferred using the Real time Transport Protocol (RTP).

The RTP/UDP/IP overhead is 40 bytes (12+8+20) for each speech packet. For example, if a 10 byte packet is transferred via RTP/UDP/IP then the overhead is 80%, i.e., 40/50. In addition, for each call request a single UDP/IP connection is established between the gateways 120, 122 requiring a large number of states (memory) to be maintained at the telephone gateways 120, 122.

Congestion in IP networks results in packet loss at routers and UDP does not have any retransmission mechanism to recover lost packets. Also, real time applications such as speech are intolerant to delay caused by re-transmission. In a traditional RTP method, each individual speech packet is transmitted as a IP packet, which generates a large number of packets between gateways. This heavy traffic volume is a potential situation for congestion and packet loss at IP routers.

The large overhead to transfer a small packets (compressed speech) through RTP/UDP/IP has been one of the drawbacks of IP telephone. In order to minimize the overhead, RTP/UDP/IP header compression is applied for slow speed links. However, this method requires compressing/decompressing at routers as well as some additional processing overhead.

Figure 2A:
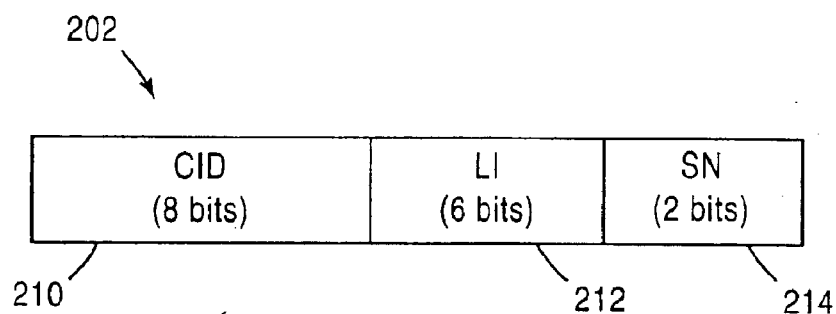
FIGS. 2a–b illustrates mini-header according to the present invention.
Figure 2B:
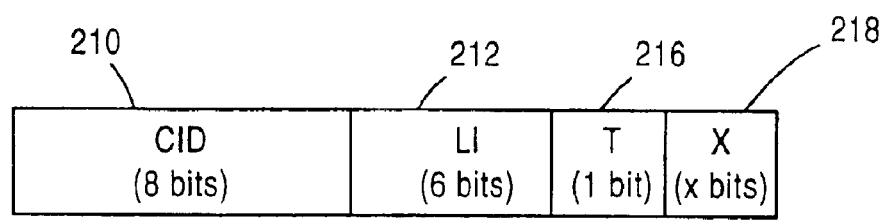
Figure 3:
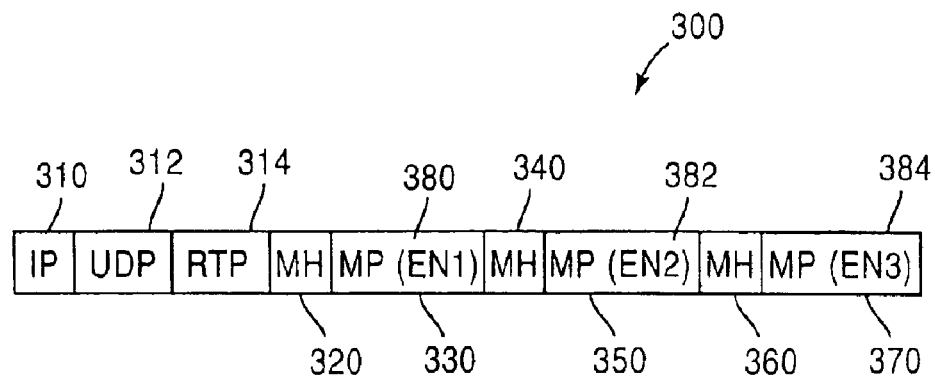
FIG. 3 illustrates the assembly of mini-packets into a single RTP/UDP/IP payload.

FIGS. 2a–b and 3 illustrate the use of mini-headers to reduce header overhead according to the mini-packet protocol. Even without compression, an equal or better bandwidth efficiency may still be achieved. Overhead is reduced by multiplexing two or more (e.g., up to 256) low bit rate connections in a single RTP/IP/UDP connection using a mini-header 202 as illustrated in FIG. 2a. Alternatively, overhead may be reduce using the mini-header 204 illustrated in FIG. 2b. However, those skilled in the art will recognize that the present invention is not meant to be limited to the particular mini-headers illustrated in FIGS. 2a–b, but that the mini-headers 202, 204 illustrated in FIGS. 2a–b are presented for illustration only. Rather, those skilled in the art will recognize that the mini-headers 202, 204 enables multiplexing of multiple small size packets, and is added to each mini-packet before it is assembled with other mini-packets as an RTP payload, as illustrated in FIG. 3.

To identify a single user among the number of users sharing the RTP connection, each user is allocated an unique Channel Identifier (CID) which is negotiated during connection setup. The CID negotiation procedures may be carried out by mini-packet signaling, which uses a TCP/IP connection for reliable transport. The most suitable application scenarios for mini-packet method include IP telephone gateways connecting PSTN/PBX/GSM users.

To identify mini-packets multiplexed on a single RTP payload, the mini-packet protocol uses a two byte header, called mini-header, for each mini-packet. The mini-header 202, as shown in FIG. 2a includes a Channel Identifier (CID) 210, a Length Indicator (LI) 212, and a Sequence Number (SN) 214. The mini-header 202 allows many users to share a single RTP/UDP/IP connection thus reducing the RTP/UDP/IP overhead per packet.

As illustrated in FIG. 2a, the mini-header includes a CID field 210, which identifies a single user among users haring a single RTP/UDP/IP connection. A CID 210 is assigned at the time of the request for access to the IP network and it is unchanged throughout the connection time. The length of the CID field 210 is 8 bits, which limits the number of users per single RTP connection to 256.

The LI field 212 indicates the size of the payload (speech packet) and the 6 bits allow a maximum of 64 byte payload. The variable size of the LI field 212 allows different codecs to share a single connection and offers the flexibility to transport any low bit rate connection using the mini-packet method. The size of the LI field 212 is limited to 64 bytes since most of the codes available today (G.723.1, G.729) generates packets less than 20 bytes per speech sample.

The 2 bit Sequence Number (SN) field 214 is used for marking the voice packets transmitted from a single user in modulo 4 method, which can be used at the receiver to identify any packet loss. The module 4 scheme will be able to identify up to 3 consecutive packet losses at IP layer.

The mini-header 204, as shown in FIG. 2b includes a Channel Identifier (CID) 210, a Length Indicator (LI) 212, a Transition bit (T) 216 and a Reserved bit (X) 218. The Channel Identification (CID) 210 in FIG. 2b is an 8 bit field which allows a maximum of 256 users to share a single RTP/UDP/IP connection. When the total number of users exceeds 256, a new RTP/UDP/IP connection is established. The LI field 212 is a 6 bit field which allows a maximum payload size of 64 bytes. The Transition bit (T) 216 is used to identify any change in processing that was applied to a mini-packet. Notification of such changes occurs by toggling the bit. Finally, the Reserved bit (X) 218 is currently undefined, but may be used, for example, as an indication of a header extension and Dual Tone Multi-Frequency (DTMF).

As mentioned above, those skilled in the art will recognize that the above illustration of mini-headers is not meant to limit the invention, but that other mini-header configurations and sizes could be used in accordance with the present invention. For example, the length of the fields could be modified within the 2 byte format. Further, other fields could be substituted and the length of the fields is not meant to be limited to provide a mini-header of 2 bytes. For example, the reserved bit illustrated in FIG. 2b may be set to "1" to indicate an extension head is included in the mini-header thereby providing an overall length for the mini-header of 3 bytes. Alternatively, the reserved bit may be set to "0" to indicate that an extension header is not included in the mini-header. Nevertheless, those skilled in the art will recognize that increases in the overall size of the mini-header will proportionally increase the total overhead when multiple mini-packets are multiplexed together in accordance with the invention. Thus, those skilled in the art will recognize that any mini-header that enables multiplexing of multiple small size packets, is added to each mini-packet before it is assembled with other mini-packets as an RTP payload as illustrated in FIG. 3, and which allows proper processing of the multiple mini-packets may be used without departing from the scope of the present invention.

The assembly of mini-packets into a single RTP/UDP/IP payload 300 is shown in FIG. 3. The mini-packets 330, 350, 370 follow the IP header 310, the UDP header 312 and the RTP header 314. Each mini-packet 330, 350, 370 is delineated by two byte mini-headers 320, 340, 360, respectively. This approach requires a simple de-multiplexing algorithm at a receiver. Because the mini-headers 320, 340, 360 in the RTP payload 300 are transparent to the intermediate IP routers, IP packet forwarding and other functionality at the IP layer may be performed without any problems. As noted in FIG. 3, each of the Mini-packets 330, 350, 370 is encrypted with a distinct encryption program. The need for providing authentication and encryption at the mini-packet level arises from the need to provide end-to-end authentication and encryption. However, since mini-packets can be switched at intermediate points in the network, providing authentication and encryption at the IP level or at the RTP packet level will not provide end-to-end authentication or encryption.

Figure 4:
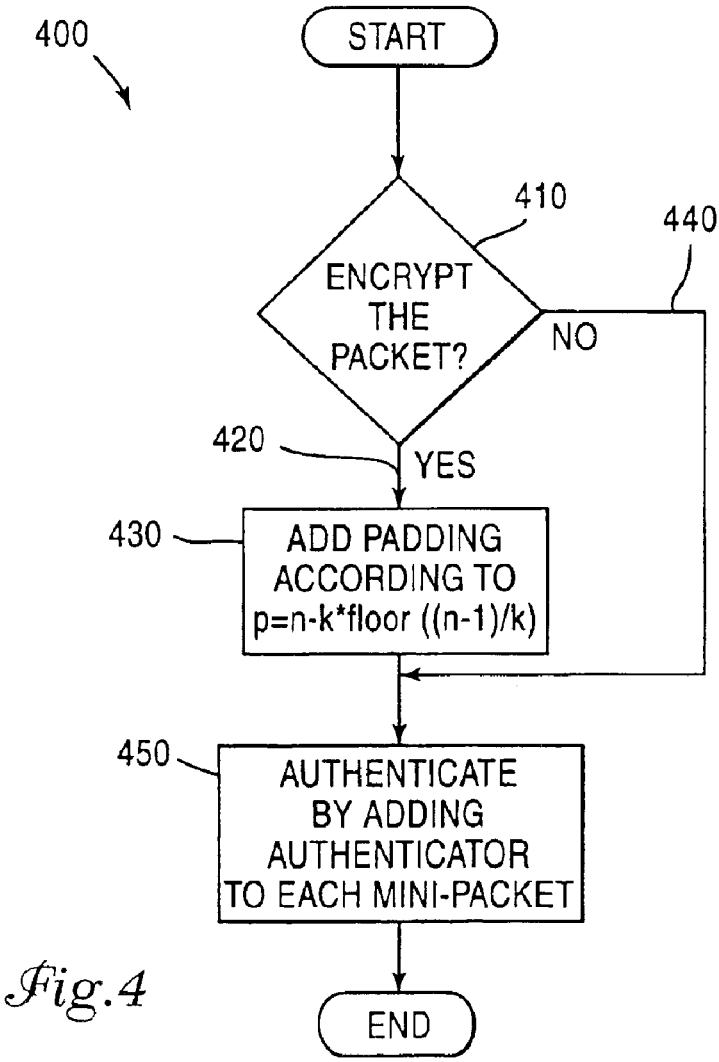
FIG. 4 illustrates a flow chart illustrating the mini-packet protocol for providing encryption, padding and authentication to mini-packets according to the present invention.

FIG. 4 illustrates a flow chart 400 illustrating the mini-packet protocol for providing encryption, padding and authentication to mini-packets according to the present invention. First, a decision is made as to whether the mini-packet is encrypted 410. If the mini-packet is encrypted 420, padding is added. If the input (actual data) is of size "n" and the block size is "k", then the amount of padding "p" is given by:

$$p=n-k*\text{floor}((n-1)/k)$$

Figure 5:
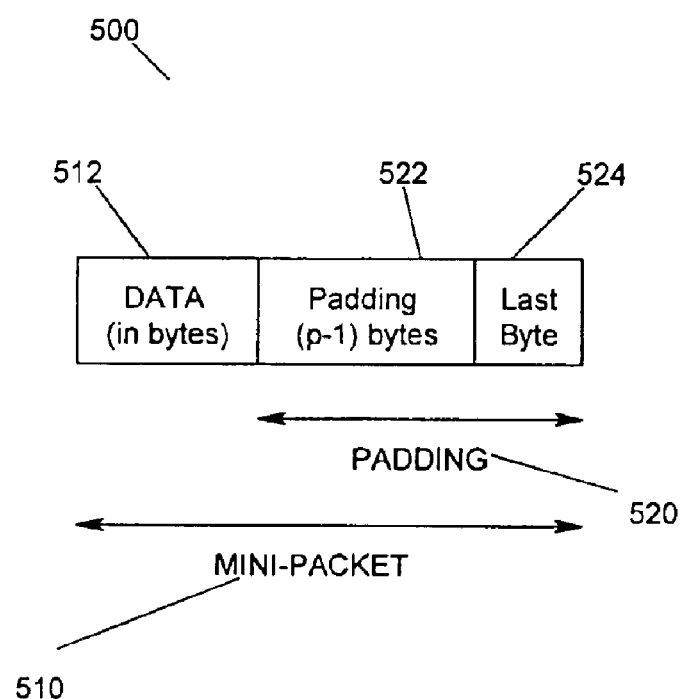
FIG. 5 illustrates a padded mini-packet according to the present invention.

It is seen that the number of padding bytes "p" varies from one to k. FIG. 5 illustrates a padded mini-packet 500 according to the present invention. In FIG. 5, the mini-packet 510 includes a data block 512. Padding of p−1 522 is added. Even for the case where the mini-packet size equals an integral multiple of the block size, k, padding equaling one block is added. In any case, the last padding byte 524 indicates the number of padding bytes. The p−1 padding bytes 522 could be arbitrarily chosen. The endpoints of the security association are aware of the encryption mechanism and parameters. The recipient after decrypting the mini-packet looks at the last byte 524 to determine the number of padding bytes 522 used.

Figure 6:
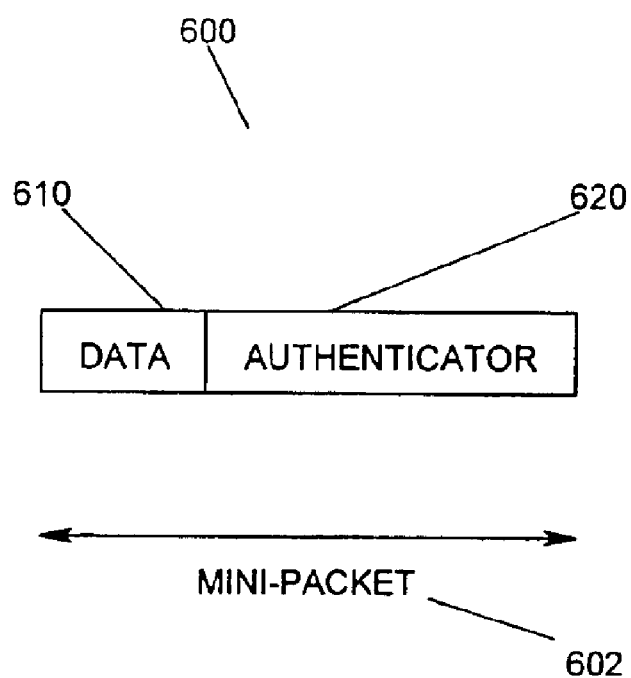
FIG. 6 illustrates a mini-packet after authentication has been performed.

Referring again to FIG. 4, if encryption is not implemented 440, or after padding is added 430, an authenticator is added to each mini-packet for authentication. FIG. 6 depicts a mini-packet 600 after authentication has been performed. In FIG. 6, the mini-packet includes a data block 610. Authentication of a mini-packet can be done by suitably appending the authenticator 620 to each mini-packet. The length indicator in the header (not shown) of each mini-packet would indicate the total length of the mini-packet including the authenticator 620. The recipient, upon receiving the mini-packet can separate the authenticator 620 from the actual data 610 based upon knowledge of the algorithm used for generating the authenticator. For instance, if HMAC-SHA1 was used, the authenticator 620 is 20 bytes, and if HMAC-MD5 is used, the authenticator 620 is 16 bytes.

Figure 7:
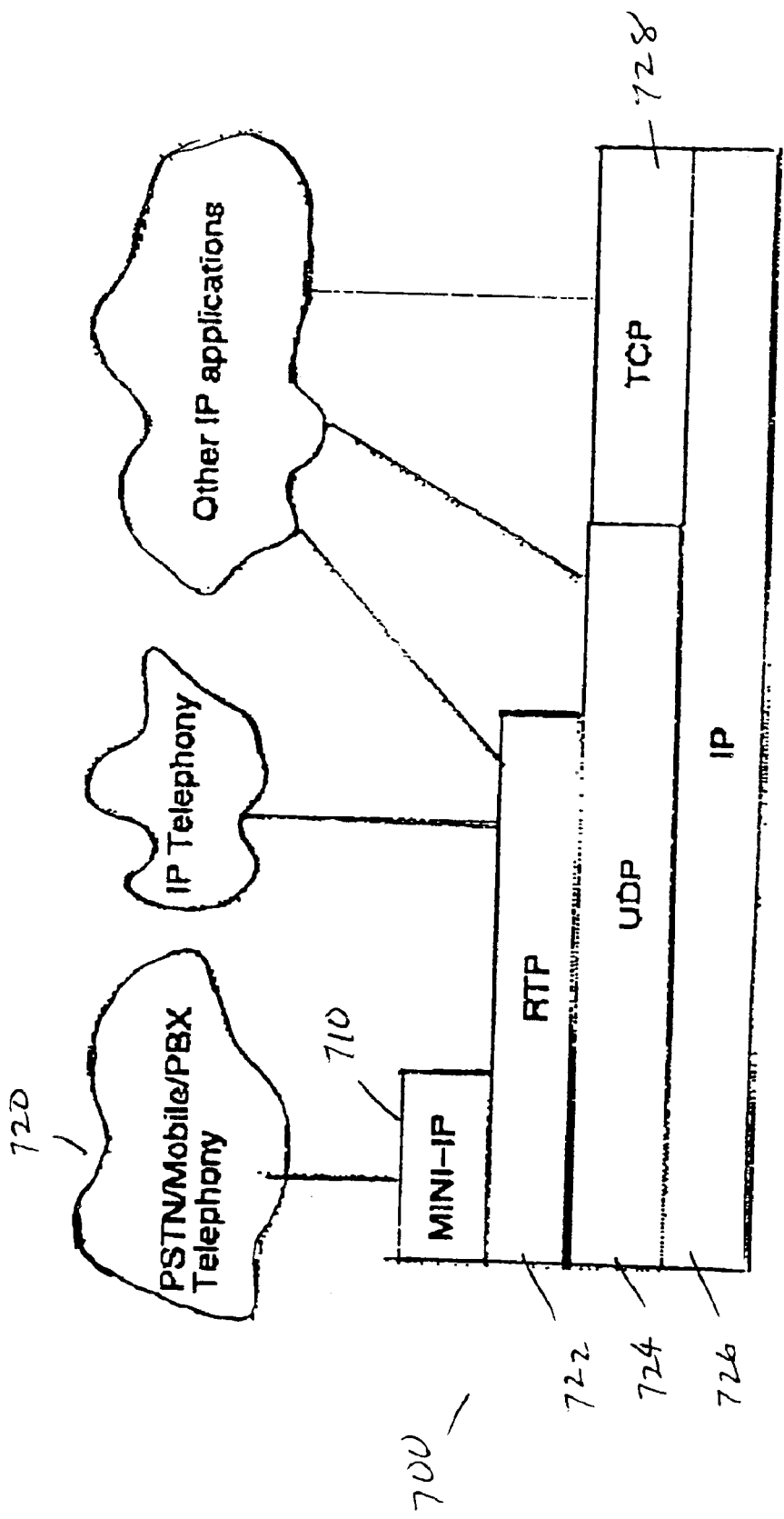
FIG. 7 illustrates the location of the mini-packet controller in a IP layered model.

A mini-packet controller is included in a gateways to implement this mini-packet method. The location of the mini-packet controller 710 in a IP layered model 700 is shown in FIG. 7. The mini-packet controller 710 is inserted between the IWF function (not shown) of the PSTN/GSM/PBX network 720 and the RTP module 722 in the IP telephone gateway. The mini-packet controller 710 is capable of receiving connection request from PSTN/GSM/PBX users 720 and setting up a channel on an existing or a new RTP/UDP/IP connection. The mini-packet controller 710 acts as an application to the layers below 722, 724, 726, 728 (RTP/UDP/IP) and uses the bearer services offered by the lower layers for effective multiplexing. Other functions of the controller include open and close RTP/UDP connections, keep track of the active users on all UDP connections, and provide inter-working with PSTN/GSM/PBX call control features.

Figure 8:
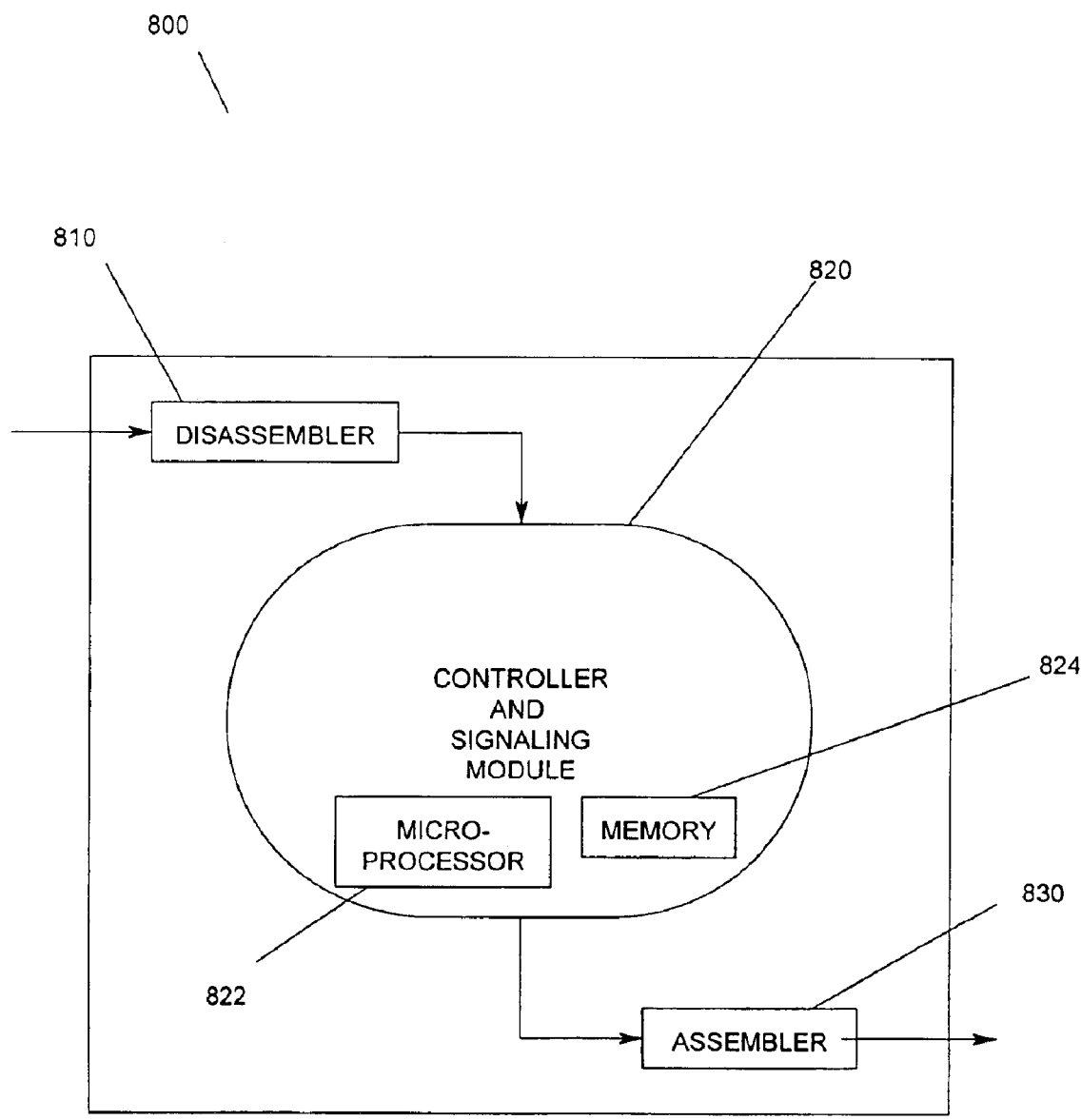
FIG. 8 illustrates a mini-packet controller according to the present invention.

FIG. 8 illustrates a mini-packet controller 800 according to the present invention. In FIG. 8, a demultiplexer/disassembler 810 receives RTP payloads and demultiplexes the mini-packets for analysis and control by the control and signaling module 820. mini-packets which destined for transmission via the same output port are multiplexed again into a RTP payload at the assembler 830.

Accordingly, FIG. 8 illustrates one example of a hardware environment for the method according to the present invention. The present invention is typically implemented in the controller and signaling module 820. The controller and signaling module 820 includes microprocessor 822 and memory 824 and other standard components. The controller and signaling module 820 executes one or more computer programs 826 which may be stored in memory 824. The present invention comprises a method and apparatus to provide encryption and authentication of a mini-packet in a multiplexed real time protocol (RTP) payload that is preferably implemented in the controller and signaling module 820 via computer programs 826.

Generally, the computer programs 826 executed by the controller and signaling module 820 may be tangibly embodied in a computer-readable medium or carrier, e.g. one or more of the fixed and/or removable data storage devices 814, or other data storage or data communications devices. The computer programs 826 may be loaded from the data storage devices 814 into the memory 824 for execution by the microprocessor as discussed above. The computer programs 826 comprise instructions which, when read and executed by the microprocessor 822, causes the controller and signaling module 820 to perform the steps necessary to execute the steps or elements of the present invention. Although an exemplary computer system configuration is illustrated in FIG. 8, those skilled in the art will recognize that any number of different configurations performing similar functions may be used in accordance with the present invention.

The method referred to in this description are typically stored as digital information on a computer readable and writeable medium. Many different storage mediums, such as magnetic tape and discs may be used with the invention. The data structure consists of one or more bytes of information stored on the medium. Typically, the method may consist of from several thousand to many million or billion bytes, depending on the application in which the invention is used.

In summary, the present invention provides a mechanism to provide encryption and authentication/integrity to a multiplexed RTP packet on a stream by stream basis. Such service differentiation among streams is critical for providers who may wish to provide value-added by differentiating security.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A mini-packet protocol comprising:
   assembling mini-packets into a payload wherein each mini-packet includes an associated mini-header for ensuring proper processing of each mini-packet; and
   adding padding to mini-packets when the mini-packets are encrypted to insure each mini-packet is an integral multiple of a predetermined block size,
   wherein padding for each min-packet is determined according to:

$p=n-k*\text{floor}(n-1)/k$, wherein p is the amount of padding added to each mini-packet, n is the actual data size, and k is the block size.

2. The mini-packet protocol of claim 1 wherein the padding added to the data for each packet comprises p−1 units of padding and a final padding unit for indicating the amount of padding.

3. The mini-packet protocol of claim 2 wherein the unit is bytes.

4. The mini-packet protocol of claim 1 further comprising adding an authenticator to each mini-packet.

5. The mini-packet protocol of claim 4 further comprising setting a length indicator in each mini-header for indicating a total length of the mini-packet including the authenticator.

6. The mini-packet protocol of claim 5 further comprising removing the authenticator based upon knowing a type of authentication used for generating the authenticator.

7. The mini-packet protocol of claim 6 wherein the type of authentication comprises HMAC-SHA1 and the authenticator is 20 bytes.

8. The mini-packet protocol of claim 6 wherein the type of authentication comprises HMAC-MD5 and the authenticator is 16 bytes.

9. A mini-packet controller comprising:
   a disassembler for receiving a payload, the payload including a plurality of mini-packets, wherein the disassembler dismantles the payload into individual mini-packets;
   a controller and signaling module, coupled to the disassembler, for processing the individual mini-packets, the controller further assembling the individual mini-packets into a payload wherein each mini-packet includes an associated mini-header for ensuring proper processing of each mini-packet and adding padding to mini-packets when the mini-packets are encrypted to insure each mini-packet is an integral multiple of a predetermined block size; and
   an assembler for combining mini-packets into a new payload for transmission via an output port,
   wherein the padding for each mini-packet is determined according to:

$p=n-k*\text{floor}(n-1)/k$, wherein p is the amount of padding added to each mini-packet, n is the actual data size, and k is the block size.

10. The mini-packet controller of claim 9 wherein the added padding for each packet comprises p−1 units of padding and a final padding unit for indicating the amount of padding.

11. The mini-packet controller of claim 10 wherein the units are bytes.

12. The mini-packet controller of claim 9 wherein the controller and signaling module adds an authenticator to each mini-packet.

13. The mini-packet controller of claim 12 wherein the controller sets a length indicator in each mini-header for indicating a total length of the mini-packet including the authenticator.

14. The mini-packet controller of claim 13 wherein the controller and signaling module removes authenticators based upon knowing a type of authentication used for generating an authenticator.

15. The mini-packet controller of claim 14 wherein the type of authentication comprises HMAC-SHA1 and the authenticator is 20 bytes.

16. The mini-packet controller of claim 14 wherein the type of authentication comprises HMAC-MD5 and the authenticator is 16 bytes.

17. An article of manufacture comprising a computer readable medium having instructions for causing a computer to perform a method comprising:
   assembling mini-packets into a payload wherein each mini-packet includes an associated mini-header for ensuring proper processing of each mini-packet; and adding padding to mini-packets when the mini-packets are encrypted to insure each mini-packet is an integral multiple of a predetermined block size, wherein padding for each mini-packet is determined according to:

$$p = n - k * \text{floor}(n-1/k),$$

wherein p is the amount of padding added to each mini-packet, n is the actual data size, and k is the block size.

18. The article of manufacture of claim 17 wherein the padding added to the data for each packet comprises p−1 units of padding and a final padding unit for indicating the amount of padding.

19. The article of manufacture of claim 18 wherein the unit is bytes.

20. The article of manufacture of claim 17 further comprising adding an authenticator to each mini-packet.

21. The article of manufacture of claim 20 further comprising setting a length indicator in each mini-header for indicating a total length of the mini-packet including the authenticator.

22. The article of manufacture of claim 21 further comprising removing the authenticator based upon knowing a type of authentication used for generating the authenticator.

23. The article of manufacture of claim 22 wherein types of authentication comprises HMAC-SHA1 and the authenticator is 20 bytes.

24. The article of manufacture of claim 22 wherein the type of authentication comprises HMAC-MD5 and the authenticator is 16 bytes.

25. The mini-packet protocol of claim 1, wherein said adding step comprises adding the padding to the mini-packets, in which the padding varies from 1 to the predetermined block size.

26. The mini-packet controller of claim 9, wherein the padding varies from 1 to the predetermined block size.

27. The article of manufacture of claim 17, wherein said adding step comprises adding the padding to the mini-packets, in which the padding varies from 1 to the predetermined block size.

* * * * *